United States Patent
Maier et al.

(10) Patent No.: US 10,012,107 B2
(45) Date of Patent: Jul. 3, 2018

(54) COMPACT COMPRESSION SYSTEM WITH INTEGRAL HEAT EXCHANGERS

(75) Inventors: William C. Maier, Almond, NY (US); Vince R. Volpe, Jr., Houston, TX (US)

(73) Assignee: DRESSER-RAND COMPANY, Olean, NY (US)

( * ) Notice: Subject to any disclaimer, the term of this patent is extended or adjusted under 35 U.S.C. 154(b) by 1114 days.

(21) Appl. No.: 14/116,786

(22) PCT Filed: May 3, 2012

(86) PCT No.: PCT/US2012/036279
§ 371 (c)(1),
(2), (4) Date: Jan. 5, 2015

(87) PCT Pub. No.: WO2014/007791
PCT Pub. Date: Jan. 9, 2014

(65) Prior Publication Data
US 2015/0184539 A1    Jul. 2, 2015

Related U.S. Application Data

(60) Provisional application No. 61/484,775, filed on May 11, 2011.

(51) Int. Cl.
*F01D 25/14* (2006.01)
*F01D 25/12* (2006.01)
(Continued)

(52) U.S. Cl.
CPC .............. *F01D 25/14* (2013.01); *B23P 15/26* (2013.01); *F01D 25/12* (2013.01); *F01D 25/24* (2013.01);
(Continued)

(58) Field of Classification Search
CPC ........ F04D 17/12; F04D 17/122; F04D 25/06; F04D 25/0686; F04D 29/586;
(Continued)

(56) References Cited

U.S. PATENT DOCUMENTS

| | | | |
|---|---|---|---|
| 1,425,855 A * | 8/1922 | Graemiger | F04D 29/5826 188/296 |
| 1,653,217 A | 12/1927 | Koch | |

(Continued)

FOREIGN PATENT DOCUMENTS

| | | |
|---|---|---|
| DE | 102008015031 A1 | 9/2009 |
| EP | 0010911 A1 | 5/1980 |

(Continued)

OTHER PUBLICATIONS

European Patent Application No. 12878212.5—Partial Supplementary European Search Report, dated Nov. 4, 2014, 5 pages.

(Continued)

*Primary Examiner* — Richard Edgar
*Assistant Examiner* — John S Hunter

(57) ABSTRACT

Apparatus for housing a rotatable component and exchanging heat and methods for manufacturing the same are disclosed. The apparatus includes a first casing and a second casing spaced apart from the first casing and defining a gap therebetween. The apparatus also includes a cooling fluid manifold coupled to a source of a cooling fluid, and a stack of plates coupled to the first and second casings and extending therebetween to fill the gap. The first and second casings and the stack of plates define at least a portion of a pressurized containment area therein. Further, the stack of plates includes a bore in which the rotatable component is received and defines process fluid flowpaths configured to direct process fluid to and/or from the rotatable component. The stack of plates is in fluid communication with the (Continued)

cooling fluid manifold and transfers heat from the process fluid to the cooling fluid.

18 Claims, 8 Drawing Sheets

(51) Int. Cl.
*B23P 15/26* (2006.01)
*F01D 25/24* (2006.01)
*F28D 9/00* (2006.01)
*F04D 29/58* (2006.01)
*F04C 29/04* (2006.01)
*F28F 3/04* (2006.01)
*F28D 21/00* (2006.01)

(52) U.S. Cl.
CPC .......... *F04C 29/04* (2013.01); *F04D 29/5826* (2013.01); *F28D 9/0012* (2013.01); *F04C 2230/00* (2013.01); *F04C 2240/20* (2013.01); *F28D 9/005* (2013.01); *F28D 2021/004* (2013.01); *F28F 3/048* (2013.01); *F28F 2255/00* (2013.01); *Y10T 29/49359* (2015.01)

(58) Field of Classification Search
CPC .. F04D 29/5866; F04D 29/5826; F28F 3/048; F28F 3/086; F01D 25/12; F01D 25/14; F01D 25/24; F28D 9/0031; F28D 9/0037; F28D 9/0043; F28D 9/005; F28D 9/0056; F28D 9/0075; F28D 9/0081
See application file for complete search history.

(56) References Cited

U.S. PATENT DOCUMENTS

| | | | |
|---|---|---|---|
| 1,857,486 A | 5/1932 | Trumpler | |
| 2,380,772 A | 7/1945 | McMahan | |
| 2,384,251 A | 9/1945 | Hill | |
| 2,474,410 A | 6/1949 | Aue | |
| 2,612,310 A | 9/1952 | Eggmann | |
| 2,870,608 A | 1/1959 | Comyns-Carr | |
| 2,925,954 A * | 2/1960 | Spillmann | F04D 19/02 415/179 |
| 3,134,536 A | 5/1964 | Adams | |
| 3,205,828 A | 9/1965 | Rupp | |
| 3,241,743 A | 3/1966 | Laing et al. | |
| 3,295,597 A | 1/1967 | Laing et al. | |
| 3,424,234 A | 1/1969 | Laing | |
| 3,559,728 A | 2/1971 | Lyman et al. | |
| 3,773,106 A | 11/1973 | Levy | |
| 3,795,458 A | 3/1974 | Strub | |
| 3,866,668 A | 2/1975 | Doerner | |
| 4,271,682 A | 6/1981 | Seki | |
| 4,665,975 A * | 5/1987 | Johnston | F28F 9/0275 165/167 |
| 4,780,061 A | 10/1988 | Butterworth | |
| 4,969,803 A * | 11/1990 | Turanskyj | F04D 17/122 415/177 |
| 5,126,612 A | 6/1992 | Girault | |
| 5,284,427 A | 2/1994 | Wacker | |
| 5,361,828 A | 11/1994 | Lee et al. | |
| 5,626,018 A | 5/1997 | Hatfield | |
| 5,674,053 A | 10/1997 | Paul et al. | |
| 5,722,241 A | 3/1998 | Huber | |
| 5,863,671 A * | 1/1999 | Spear, Jr. | F28D 9/0075 429/413 |
| 6,170,568 B1 | 1/2001 | Valenzuela | |
| 6,182,748 B1 | 2/2001 | Brost et al. | |
| 6,203,275 B1 | 3/2001 | Kobayashi et al. | |
| 6,273,184 B1 | 8/2001 | Nishishita | |
| 6,345,503 B1 | 2/2002 | Gladden | |
| 6,629,427 B1 | 10/2003 | Piao et al. | |
| 6,764,279 B2 | 7/2004 | Meshenky | |
| 6,790,014 B2 | 9/2004 | Bowen | |
| 6,929,056 B2 | 8/2005 | Meshenky et al. | |
| 6,948,909 B2 * | 9/2005 | Meshenky | F02B 29/0412 165/125 |
| 6,973,965 B2 | 12/2005 | Meshenky | |
| 7,077,113 B2 | 7/2006 | Bilek et al. | |
| 7,172,016 B2 * | 2/2007 | Meshenky | F02B 29/0462 165/125 |
| 7,278,472 B2 | 10/2007 | Meshenky et al. | |
| 7,334,631 B2 * | 2/2008 | Kato | F28D 9/005 165/166 |
| 7,469,689 B1 | 12/2008 | Jones et al. | |
| 8,814,509 B2 | 8/2014 | Moore et al. | |
| 9,062,548 B2 | 6/2015 | Frazier et al. | |
| 9,175,883 B2 | 11/2015 | Koberstein et al. | |
| 2004/0055740 A1 | 3/2004 | Meshenky et al. | |
| 2006/0113063 A1 | 6/2006 | Chordia et al. | |
| 2009/0028730 A1 | 1/2009 | Radermacher et al. | |
| 2009/0294113 A1 | 12/2009 | Cha et al. | |
| 2010/0170666 A1 | 7/2010 | Zess et al. | |
| 2012/0063882 A1 | 3/2012 | Moore et al. | |
| 2014/0321971 A1 | 10/2014 | Moore et al. | |

FOREIGN PATENT DOCUMENTS

| | | |
|---|---|---|
| EP | 0212878 A1 | 3/1987 |
| GB | 805195 | 12/1958 |
| JP | H06294398 A | 10/1994 |
| JP | 9303287 A | 11/1997 |
| JP | 2004300929 A | 10/2004 |
| JP | 2009221966 A | 10/2009 |
| JP | 2010151034 A | 7/2010 |
| WO | 2012033744 A2 | 3/2012 |
| WO | 2014134266 A1 | 9/2014 |

OTHER PUBLICATIONS

PCT/US11/50520—Notification of Transmittal of International Preliminary Report on Patentability, International Preliminary Report on Patentability, dated May 3, 2013, 9 pages.

PCT/US2011/050520—Notification of Transmittal of the International Search Report and the Written Opinion of the International Searching Authority, or the Declaration, International Search Report, Written Opinion of the International Searching Authority, dated Apr. 27, 2012, 7 pages.

PCT/US2012/036279—International Preliminary Report on Patentability, Written Opinion of the International Searching Authority, dated Dec. 23, 2013, 5 pages.

PCT/US2012/036279—Notification of Transmittal of the International Search Report and the Written Opinion of the International Searching Authority, or the Declaration, International Search Report, Written Opinion of the International Searching Authority, dated Nov. 5, 2012, 9 pages.

PCT/US2014/018909—International Preliminary Report on Patentability, Written Opinion of the International Searching Authority, dated Sep. 1, 2015, 7 pages.

PCT/US2014/018909—International Search Report, Written Opinion of the International Searching Authority, dated Jun. 24, 2014, 9 pages.

* cited by examiner

COMPACT COMPRESSION SYSTEM WITH INTEGRAL HEAT EXCHANGERS

The present application is a national stage application of PCT Pat. App. No. PCT/US2012/036279, filed May 3, 2012, which claims priority to U.S. Patent Application Ser. No. 61/484,775, which was filed May 11, 2011. These priority applications are incorporated by reference in their entirety into the present application, to the extent that these priority applications are not inconsistent with the present application.

BACKGROUND

Industrial gas compressors can be arranged in compression trains, which are used in a variety of industries to provide increased pressure in process fluids. Examples of such industrial uses include petroleum refineries, offshore oil production platforms, pipeline compressor stations, LNG liquefaction systems, and others. In many of these applications, space is at a premium and, thus, there is an ever-increasing demand for more compact compression systems. The development of "compact compressors" has enabled significant size reductions via combining a pressurized, high-speed motor and magnetic bearing system with the compressor in a single, hermetically-sealed motor-compressor module. One such system is the DATUM® C, which is commercially-available from Dresser-Rand Company of Olean, N.Y., USA.

These compact compression systems generally provide a higher motor power density and eliminate at least some of the gearboxes and traditional lubrication systems, thereby achieving significant reductions in size. However, these systems are typically packaged with conventional, external process equipment modules, including heat exchangers. Such heat exchangers are used either to limit the temperature of the process gas or to minimize the power required for gas compression. While proven reliable and suitable for a variety of different applications, the use of external heat exchangers often requires multiple compressor casing penetrations and significant interconnecting piping between the heat exchangers and the compressor. Accordingly, this scheme often results in a relatively large and complex compressor package.

Other compression system designs have attempted to integrate the heat exchangers within the compressor casing. While offering some improvement over traditional discrete component solutions, these designs generally increase the size of the compressor casing, both radially and axially, to provide the additional volume required to house the heat exchangers, thus somewhat defeating the size reduction/compact design intent of the system. Moreover, the number of compression stages that can be used is generally limited, as the size increase for additional heat exchangers compounds the size increase required for the additional stages. This generally results in a reduced pressure rise capability of the overall compression package. Further, the integration of such heat exchangers has, in some cases, led to significant losses in aerodynamic efficiency in the compressors.

What is needed is a compact compression system that provides integral process gas cooling, without suffering from the described drawbacks.

SUMMARY

Embodiments of the disclosure may provide an exemplary apparatus for housing a rotatable component. The apparatus may include a first casing and a second casing spaced apart from the first casing and defining a gap therebetween. The apparatus may also include a cooling fluid manifold coupled to a source of a cooling fluid, and a stack of plates coupled to the first and second casings and extending therebetween to fill the gap. The first and second casings and the stack of plates define at least a portion of a pressurized containment area therein. Further, the stack of plates includes a bore in which the rotatable component is received, and defines process fluid flowpaths configured to direct process fluid at least one of to and from the rotatable component. Additionally, the stack of plates is in fluid communication with the cooling fluid manifold and is configured to transfer heat from the process fluid to the cooling fluid.

Embodiments of the disclosure may further provide an exemplary heat exchanger for a turbomachine. The heat exchanger may include a cooling fluid manifold coupled to a source of cooling fluid, and a stack of plates providing at least a portion of a pressurized casing and having a bore defined therein through which a rotatable component is received. The stack of plates includes a plurality of first faces, each including a cooling fluid port extending therethrough and in fluid communication with the cooling fluid manifold, a process fluid passage extending therethrough, and a plurality of channels extending from the bore to the fluid passage and being in fluid communication with both. The stack of plates also includes a plurality of second faces each including a fluid port extending therethough and in fluid communication with the cooling fluid manifold, a fluid passage extending therethrough, and a plurality of channels extending from the cooling fluid port and being in fluid communication therewith to distribute the cooling fluid.

Embodiments of the disclosure may further provide an exemplary method for manufacturing a heat exchanger. The method may include masking portions of a first plurality of plates and portions of a second plurality of plates, and forming a cooling fluid port and a process fluid passage through each of the first and second pluralities of plates. The method may further include forming channels in unmasked portions of the first and second pluralities of plates using at least one of electrochemical and chemical milling, with the channels of the first plurality of plates extending between a bore thereof and the process fluid passage thereof, and the channels of the second plurality of plates extending from the cooling fluid port. The method may also include interleaving the first and second pluralities of plates, and aligning the bore, cooling fluid port, and process fluid passage of each of the first and second pluralities of plates. The method may further include securing the first and second pluralities of plates together to cover the channels defined in each and to form a monolithic structure configured to provide at least a portion of a pressurized casing for a turbomachine, a motor, or both.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
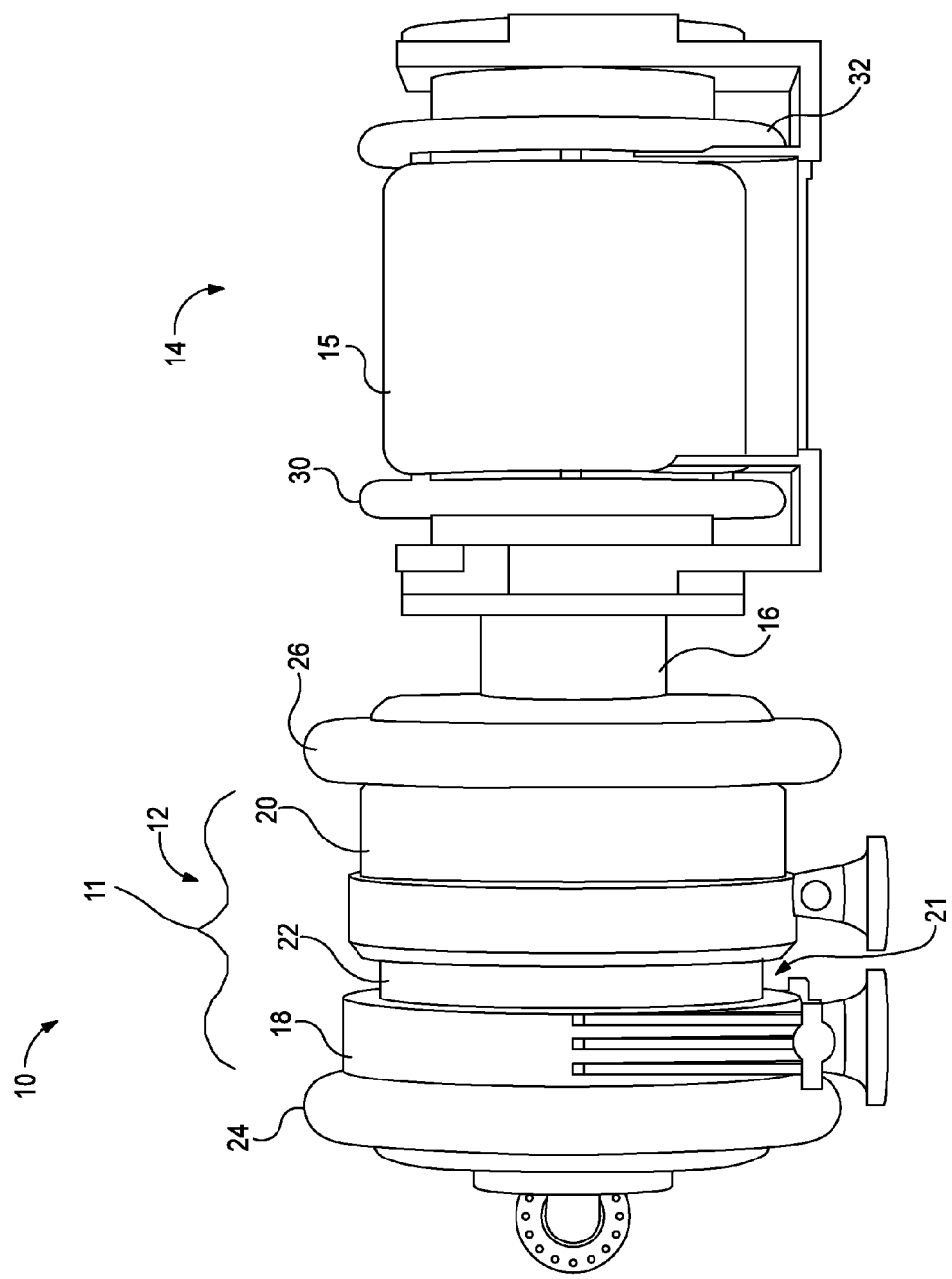
FIG. 1 illustrates an elevation view of a compact compression system, in accordance with one or more embodiments of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
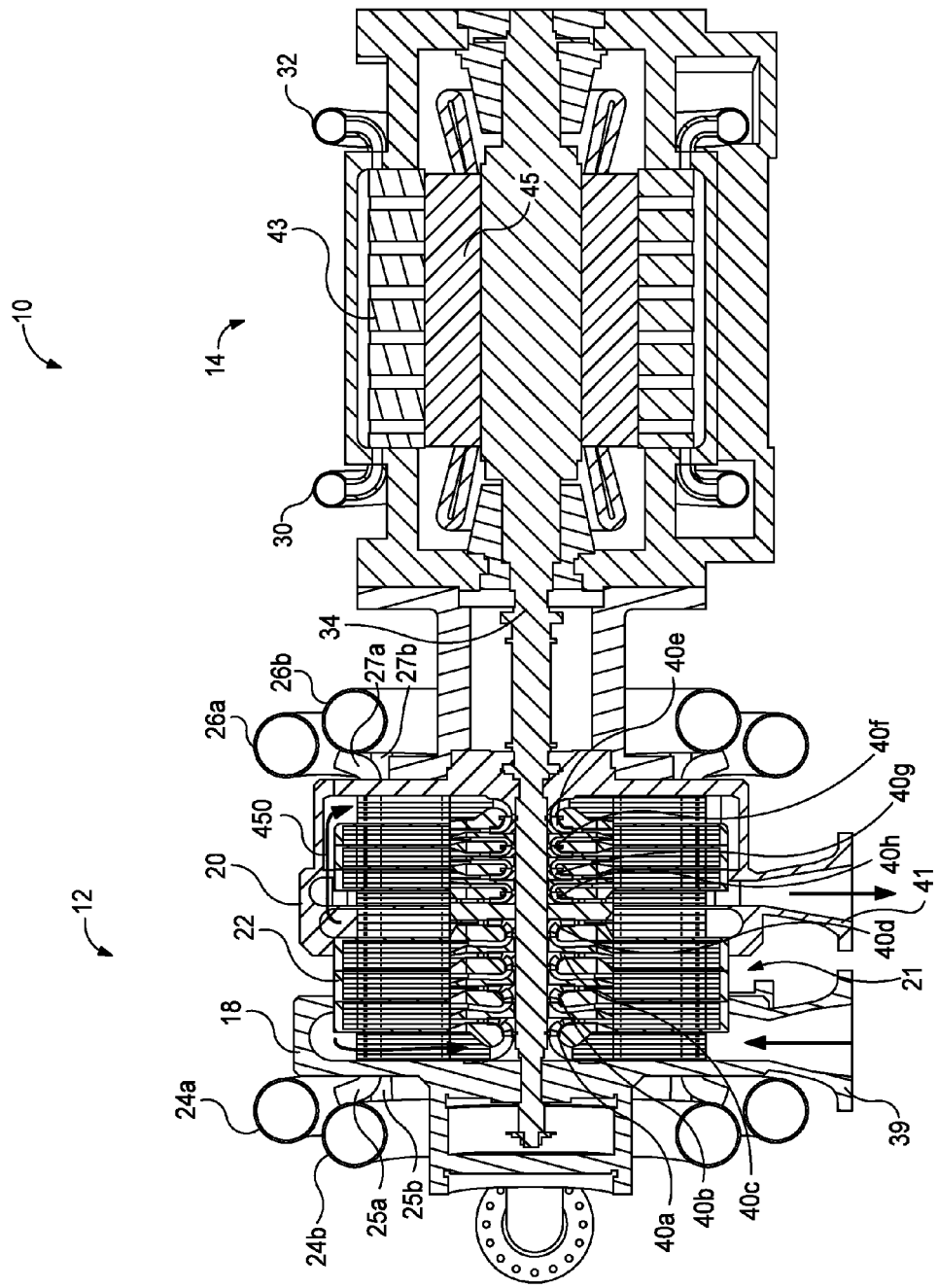
FIG. 2 illustrates a side, cross-sectional view of the compact compression system, in accordance with one or more embodiments of the disclosure.

FIGS. 1 and 2 illustrate an elevation view and a side, cross-sectional view, respectively, of a compact compression system 10, according to one or more embodiments of the present disclosure. As shown, the system 10 includes a compressor 12 enclosed in a casing 11, with at least a portion of the casing 11 being provided by a stack of plates 22. The stack of plates 22 is bonded or otherwise connected together so as to form at least a portion of a monolithic, pressure containment vessel. Further, the stack of plates 22 provides a flowpath for process fluid between stages of the compressor 12, as well as one or more flowpaths for cooling fluid to remove heat from the process fluid, without mixing with the process fluid or substantially sacrificing aerodynamic efficiency of the compressor 12. As the stack of plates 22 provides at least a portion of the pressure containment vessel, its addition provides desirable heat exchange functionality without requiring significant enlargement of the compressor casing 11.

In general, the stack of plates 22 may include a combination of process fluid plates 100 and cooling fluid plates 200, which are shown in and described in greater detail below with respect to FIGS. 4A-4C and 5A-5B, respectively. The plates 100, 200 of the stack of plates 22 define flowpaths for the cooling fluid and the process fluid. For example, the cooling fluid plates 200 each provide a flowpath for the cooling fluid to course therethrough. Each cooling fluid plate 200 may also provide a passage for the process fluid, which enables the process fluid to proceed past the cooling fluid plates 200 of the stack 22, without mixing with the process fluid. On the other hand, the process fluid plates 100 provide flowpaths for the process fluid to proceed radially-inward or radially-outward, and then allow it to pass to adjacent process fluid plates 100 within the stack of plates 22. Each process fluid plate 100 also provides a passage through which the cooling fluid is transferred to adjacent cooling fluid plates 200 of the stack 22, while preventing the cooling fluid from mixing with the process fluid. Additionally, the structures formed in the process fluid plates 100 and cooling fluid plates 200 may be formed in reverse faces of a thicker plate, as will be described in greater detail below.

In various embodiments, the process fluid plates 100 and/or the cooling fluid plates 200 may be relatively thin and may be fabricated using chemical or electrochemical milling or etching processes. Accordingly, the plates 100, 200 may be referred to as printed circuit heat exchangers. The plates 100, 200 may be bonded, welded, brazed, or otherwise connected together to form the stack 22, such that the stack 22 provides a pressurized containment barrier for the process fluid. As such, the compact compression system 10 provides desirable heat transfer from the process fluid to the cooling fluid within the compressor 12, without requiring substantial radial or axial expansion of the compressor casing and without substantially sacrificing aerodynamic efficiency.

Turning to the illustrated embodiments now in greater detail, FIG. 1 illustrates the compact compression system 10 including the compressor 12, as well as a motor 14 operatively coupled to the compressor 12. The motor 14 is encased in a motor casing 15, which is coupled to and, for example, hermetically-sealed with a connector casing 16. The compressor 12 may be a centrifugal compressor, for example, a back-to-back compressor; however, any one of the variety of compressors known in the art, including straight-through centrifugal compressors, may be used in the described compact compression system 10. In at least one embodiment, the compressor 12 may be one of the DATUM® family of compressors, commercially-available from Dresser-Rand Company of Olean, N.Y., USA.

The casing 11 for the compressor 12 is split into a first compressor casing 18 and a second compressor casing 20. The first and second compressor casings 18, 20 are spaced apart from each other, leaving a gap 21 therebetween. It will be appreciated, however, that the casing 11 may be split into more than two casings and/or additional compressor casings may be employed without departing from the scope of the disclosure. In the illustrated embodiment, the second compressor casing 20 is coupled to and may be hermetically-sealed with the connector casing 16. The exterior circumference of the stack of plates 22 fills the gap 21. As noted above, the stack of plates 22 provides an internal heat exchanging structure for the compressor 12, while also containing the pressurized fluid therein and defining flowpaths therethrough.

Cooling fluid manifolds 24, 26 may surround the first and second compressor casings 18, 20, respectively, proximal the axial extents of the compressor 12. The cooling fluid manifolds 24, 26 may include one, two, or more toroidal structures (i.e., tubes) that are disposed around the first and second compressor casings 18, 20, respectively. The cooling fluid manifolds 24, 26 may fluidly communicate with the stack of plates 22 via lines extending through the first and second compressor casings 18, 20, as will be described in greater detail below. Accordingly, the cooling fluid manifolds 24, 26 may each be configured to supply cooling fluid to the stack of plates 22 and/or to receive heated or "spent" cooling fluid therefrom via lines extending through the casing 11 and communicating with the manifolds 24, 26. The cooling fluid manifolds 24, 26 are sized to allow a flow rate of cooling fluid calculated to provide an optimal tradeoff between heat transfer rate and size in the compact compression system 10.

The cooling fluid, supplied to the stack of plates 22 via the manifolds 24, 26, may be received from any suitable source of cooling fluid (not shown), for example, water from a lake, river, or another body of salt or fresh water. In other embodiments, the cooling fluid may be a refrigerant that is cooled as part of a conventional refrigeration cycle or may be a portion of the process fluid compressed by the compressor 12. In still other embodiments, the cooling fluid may be any fluid that is convenient, for example, liquefied natural gas.

Similarly, cooling fluid manifolds 30, 32 may surround the motor casing 15, for example, proximal the axial extents thereof, as shown. The cooling fluid manifolds 30, 32 may be toroidal, extending circumferentially around the exterior of the motor casing 15. The manifolds 30, 32 may each include one, two, or several tubes configured to provide cooling fluid to and/or receive cooling fluid from heat exchangers disposed within the motor casing 15. Accordingly, the manifolds 30, 32 may each be configured to allow a flow rate of cooling fluid therethrough calculated to provide an optimal tradeoff between heat transfer rate and size in the compact compression system 10.

FIG. 2 illustrates a side, cross-sectional view of the compact compression system 10, according to an embodiment. As shown, the stack of plates 22 extends between the first and second compressor casings 18, 20, filling the gap 21 therebetween and extending at least partially through the first and second compressor casings 18, 20. The stack of plates 22 is welded, brazed, bonded, or otherwise secured together to form a single, monolithic, cylindrical structure which surrounds a shaft 34 and impellers 40a-h of the compressor 12. By filling the gap 21 between the first and second compressor casings 18, 20, the stack of plates 22 provides a pressurized area in which the impellers 40a-h are arranged.

A process fluid inlet 39 is coupled to the first compressor casing 18. The process fluid inlet 39 may be a nozzle, as shown. A process fluid outlet 41 may be coupled to the second compressor casing 20 and may also be a nozzle. The inlet 39 and outlet 41 may be fluidly coupled to the stack of plates 22, with process flowing upstream of the inlet 39 and downstream of the outlet 41 being generally considered outside of the compact compression system 10. In various embodiments, additional inlets and outlets in the casings 18, 20 may also be provided to perform any one of a variety of different functions which are well-known in the art. Furthermore, the illustrated positioning of the inlet 39 and outlet 41 with respect to the first and second compressor casings 18, 20 is merely exemplary; accordingly, in various embodiments, the inlet 39 may be coupled to either of the first or second compressor casings 18, 20, as may the outlet 41. Additionally, embodiments in which both the inlet 39 and outlet 41 are coupled to one of the two compressor casings 18, 20 are also contemplated herein.

The stack of plates 22 is fluidly coupled to the cooling fluid manifolds 24, 26 via lines 25a,b and 27a,b respectively. In at least one embodiment, the cooling fluid manifolds 24, 26 may be provided by a pair of toroidal tubes 24a, 24b and 26a, 26b, respectively, as shown. The lines 25a,b, extend through the first compressor casing 18 and fluidly couple the tube 24a,b with the stack of plates 22. Similarly, the lines 27a,b extend through the second compressor casing 20 and fluidly couple the tubes 26a,b with the stack of plates 22. In an embodiment, the tubes 24a,b may be configured to supply cooling fluid to the stack of plates 22, while tubes 26a,b may be configured to receive spent cooling fluid therefrom. In another embodiment, two reverse, parallel cooling fluid flowpaths through the stack of plates 22 may be provided, with the tubes 24a, 26a providing cooling fluid and tubes 24b, 26b receiving spent cooling fluid from the stack of plates 22. In various embodiments, however, any suitable flowpath orientation may be used, to include a single-direction flowpath, which may be provided with sufficient flowrate to enable effective heat transfer from the process fluid to the cooling fluid. The details of the flowpath of the cooling fluid within the stack of plates 22 will be described in greater detail below.

It will be appreciated that the compressor 12 may include more or fewer impellers than the eight impellers 40a-h shown, without departing from the scope of this disclosure. Further, although the impellers 40a-h provide the structure for compressing a process fluid in the illustrated embodiment, it will be appreciated than any type of compression structure (e.g., fans, blades, screws, pistons, etc.) may be used in lieu of or in addition to the impellers 40a-h.

The motor 14 similarly includes a stack of plates 43 disposed around windings 45 of the motor 14. It will be appreciated that in embodiments in which the motor 14 is not an electric motor, the windings 45 may be replaced with other driving structures that may also require cooling. The stack of plates 43 in the motor 14 is fluidly coupled to the cooling fluid manifolds 30, 32 and receives cooling fluid therefrom and discharges spent cooling fluid thereto.

Although not shown, in various embodiments, the compact compression system 10 may include one or more fluid separators. Such fluid separators may include one or more driven rotary separators disposed on the shaft 34 and configured to rotate therewith, static separators, rotary separators that are driven by the pressure in the process fluid, and/or other types of separators known to those skilled in the art. Such separators may be positioned within the stack of plates 22, within the first or second compressor casings 18, 20, or both. Examples of such separators include those described in commonly-assigned U.S. Pat. Nos. 5,385,446; 5,664,420; 5,685,691; 5,750,040; 7,241,392; and 7,288,202; U.S. Patent Applications having Publication Nos. 2011/0017307; 2010/0072121; 2010/0038309; 2009/0304496; 2009/0321343; 2009/00324391; and U.S. Patent Applications having Ser. Nos. 61/303,273; 61/312,067; 61/362,842; 12/877,177. The entirety of each of the foregoing patents and patent applications is incorporated by reference herein to the extent consistent with the present disclosure.

Figure 3:
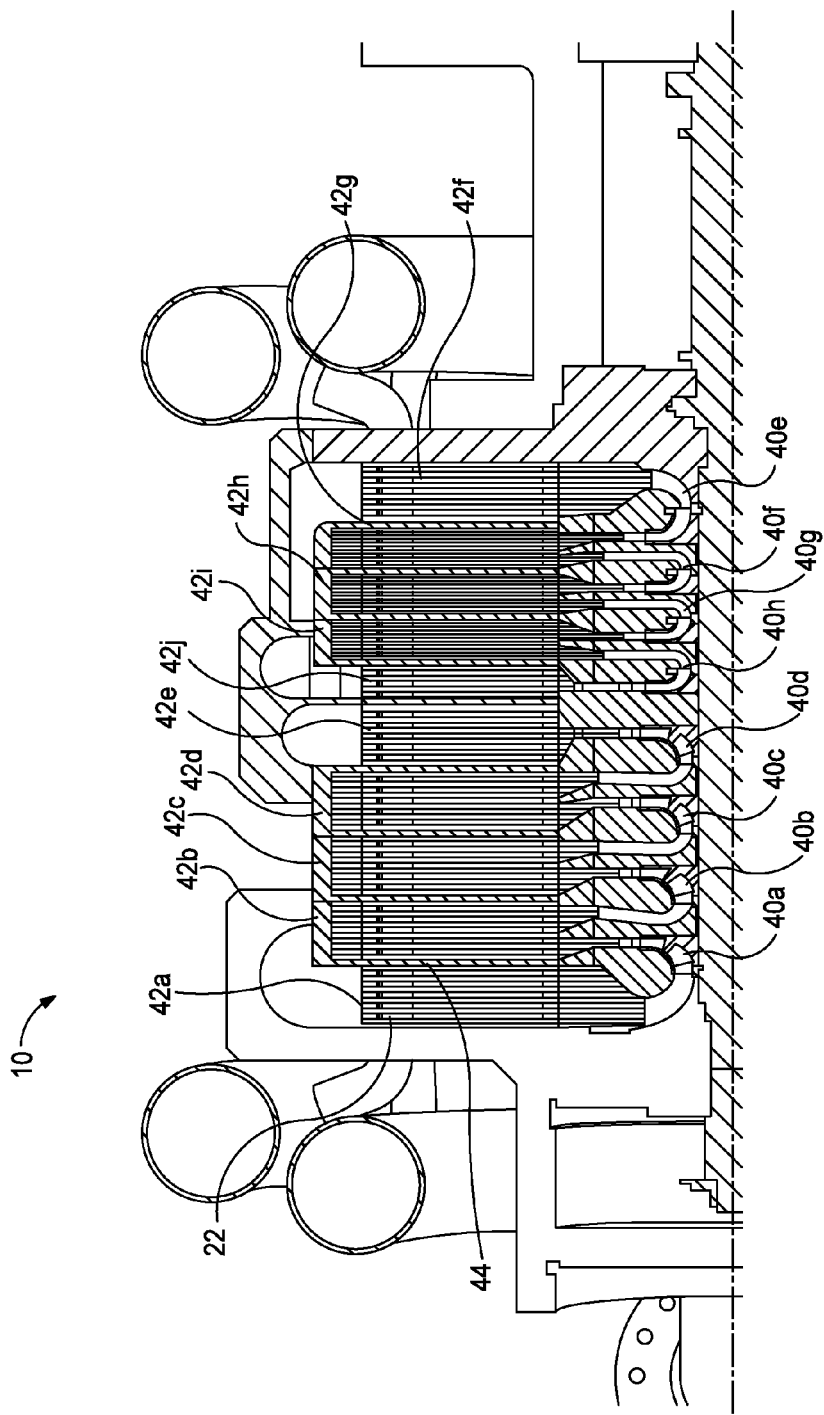
FIG. 3 illustrates an enlarged view of a portion of FIG. 2.

FIG. 3 illustrates an enlarged view of a portion of FIG. 2, further depicting aspects of the compact compression system 10, according to an embodiment. As shown, the stack of plates 22 generally includes sections (in this embodiment, ten sections are shown: 42a-j). Each section 42a-j defines a flowpath between two components of the compressor 12, with the sections 42a-j each being separated from each other by a blank 44. The blank 44 may lack apertures providing for axial transfer of process fluid, whereas the other plates within the stack of plates 22 may each include one or more process fluid axial transfer passages, as will be described in greater detail below. The blanks 44 may, however, include axial cooling fluid transfer passages, to allow the cooling fluid to proceed into adjacent sections 42a-j, as will also be described in greater detail below.

Figure 4B:
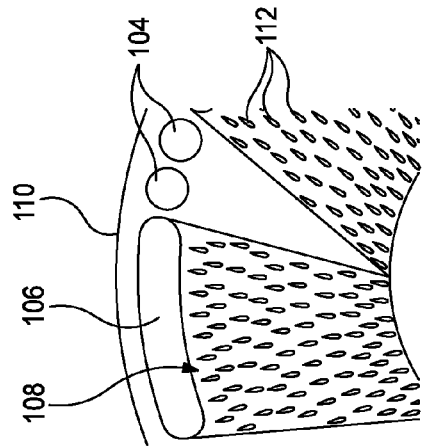
FIG. 4B illustrates an enlarged view of a portion of FIG. 4A.
Figure 4C:
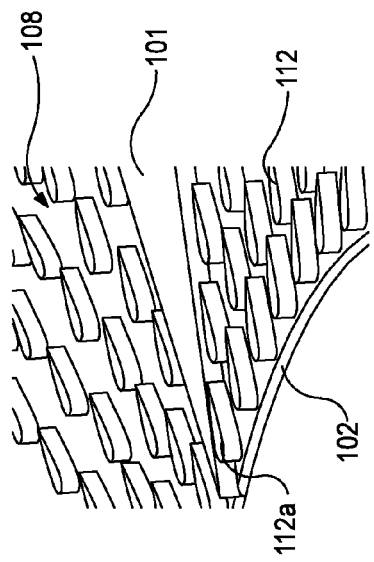
FIG. 4C illustrates an enlarged perspective view of a portion of the heat exchanger plate of FIG. 4A.
Figure 4A:
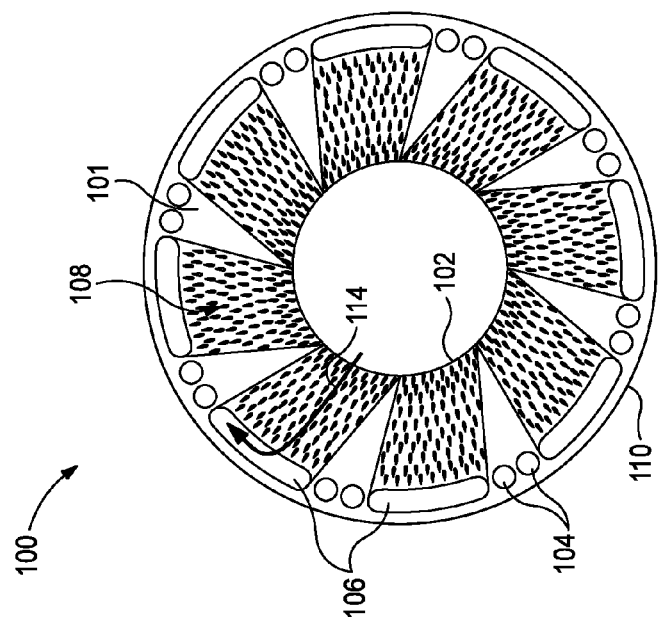
FIG. 4A illustrates an end view of a heat exchanger plate for use in a compact compression system, in accordance with one or more embodiments of the disclosure.

FIG. 4A illustrates an end view of a process fluid plate 100, according to an embodiment, while FIGS. 4B and 4C illustrate an enlarged, partial view of FIG. 4A and an enlarged, perspective view thereof, respectively. The process fluid plate 100 may be used in the stack of plates 22, described above. The process fluid plate 100 may be generally disk-shaped as shown, and may be thin, as best appreciated in FIG. 4C. It will also be appreciated, however, that the process fluid plate 100 may take any shape, as desired. For example, the process fluid plate 100 may be elliptical, square, rectangular, etc.

The process fluid plate 100 includes an axial face 101 and a bore 102. The bore 102 is sized to receive one or more fluid handling components, for example, the impellers 40a-h and shaft 34 shown in and described above with reference to FIGS. 1-3. The process fluid plate 100 may also include cooling fluid ports 104 and process fluid passages 106. The cooling fluid ports 104 and process fluid passages 106 are formed in the face 101 and extend axially through the process fluid plate 100. Further, both the cooling fluid ports 104 and the process fluid passages 106 may be disposed proximal an outer diameter 110 of the process fluid plate 100, as shown. In this context, "proximal" is generally intended to mean closer to the outer diameter 110 than to the bore 102. In other embodiments, however, the cooling fluid ports 104 and/or process fluid passages 106 may be disposed in any other location on the process fluid plate 100, as desired.

Radial channels 108 may be formed in the face 101 of the process fluid plate 100 and may extend radially between the bore 102 and the outer diameter 110. In an embodiment, the radial channels 108 may be angled, such that fluid flowing therethrough proceeds in the circumferential direction in addition to the radial direction. Further, each radial channel 108 may increase in circumferential width proceeding from the bore 102 toward the outer diameter 110; however, in some embodiments, the circumferential width may remain approximately constant. Each radial channel 108 may be aligned with one of the process fluid passages 106, with the process fluid passage 106 having generally the same circumferential dimension (i.e., width) as the radial channel 108 proximal the outer diameter 110. Although not shown, in other embodiments, each radial channel 108 may be aligned with a plurality of the process fluid passages 106, with each of the process fluid passages 106 spanning a portion of the width of the radial channel 108. In still other embodiments, each process fluid passage 106 may be aligned with two or more of the radial channels 108.

Each radial channel 108 may also include fins 112 positioned therein. The fins 112 may be any suitable shape, for example, cylindrical, rectilinear, elliptical, or, as shown, aerofoil. Providing aerofoil-shaped fins 112 may reduce drag losses incurred by the placement of such obstructions to the flowpath provided by the radial channels 108. In addition to minimizing aerodynamic losses, the fins 112 may be positioned to provide a maximum contact surface area for the process fluid flowing past. Accordingly, depending on the intended radial direction of flow through the radial channels 108, the fins 112 may be oriented as shown, or reversed. Moreover, as best shown in FIG. 4C, the fins 112 may be positioned in the radial channel 108, such that their tops 112a are, or nearly are, even with (e.g., at the same axial location as) the face 101 outside of the radial channels 108. As such, the face 101 and the top 112a of each fin 112 may be flush-mounted to an adjacent structure (not shown), such that the adjacent structure provides a cover for the radial channels 108.

In an embodiment, the cooling fluid ports 104 may be disposed between pairs of process fluid passages 106, as shown, and may be in fluid communication with one or more cooling fluid manifolds, such as those described above with reference to FIGS. 1-3. The cooling fluid ports 104 may be aligned with the portions of the face 101 that do not include the radial channels 108. Accordingly, the cooling fluid ports 104 may be configured to provide pass-through for cooling fluid to traverse axially through the process fluid plate 100, while avoiding comingling the cooling fluid with the process fluid flowing through the radial channels 108. The cooling fluid ports 104 may be generally circular, as shown; however, in embodiments in which the cooling fluid ports 104 do not obstruct the flowpath (as shown, provided in the radial channels 108), the cooling fluid ports 104 may be formed in any convenient shape.

Additional process fluid plates 100, with fins 112 oriented in the reverse direction from what is illustrated in FIGS. 4A-4C may be provided to allow process fluid to flow from the process fluid passages 106, through the radial channels 108 and to any fluid handling components disposed in the bore 102.

Figure 5B:
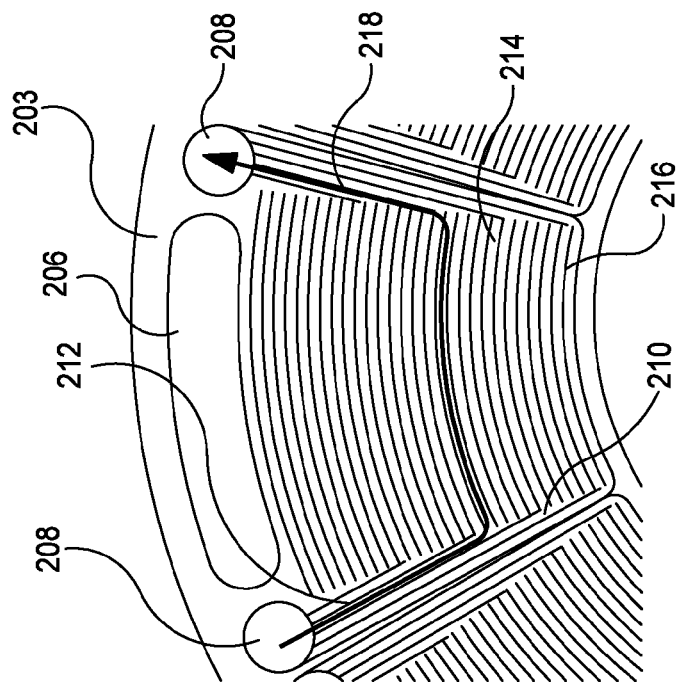
FIG. 5B illustrates an enlarged view of a portion of the heat exchanger plate of FIG. 5A.
Figure 5A:
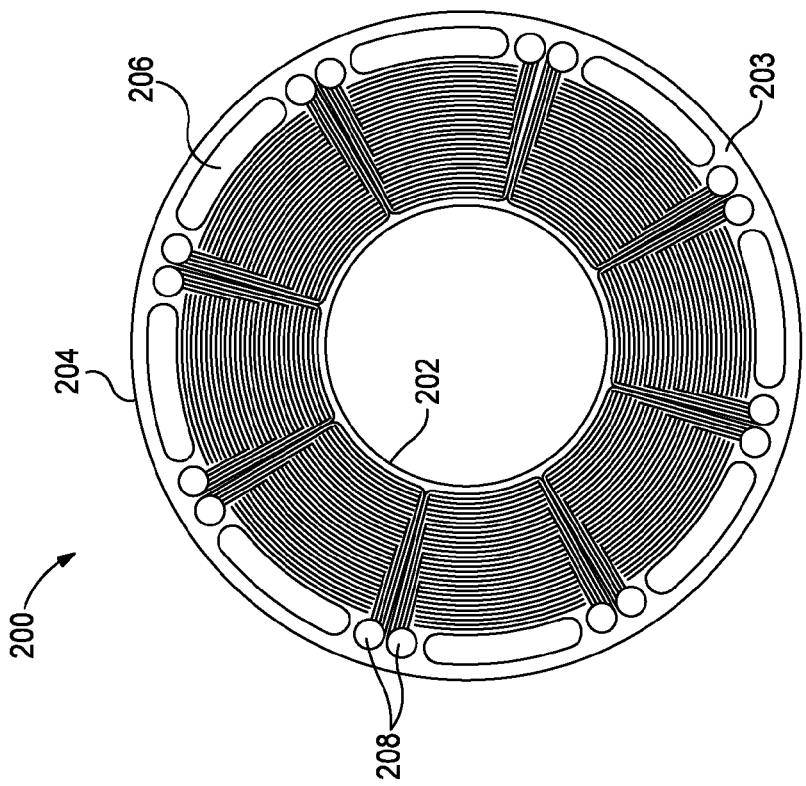
FIG. 5A illustrates an end view of another heat exchanger plate for use in a compact compression system, in accordance with one or more embodiments of the disclosure.

FIG. 5A illustrates an end perspective view of a cooling fluid plate 200, and FIG. 5B illustrates an enlarged, partial perspective view thereof, according to one or more embodiments. The cooling fluid plate 200 may be configured for use in the stack of plates 22, described above with reference to FIGS. 1-3. The cooling fluid plate 200 may be thin and disk-shaped as shown, similar in size and shape to the process fluid plate 100 described above with reference to FIGS. 4A-4C, but in other embodiments may be any suitable shape. In the illustrated embodiment, the cooling fluid plate 200 includes a bore 202 and an outer diameter 204. The bore 202 is sized to receive fluid handling components, such as the impellers 40*a-h* and shaft 34 described above with reference to FIGS. 1-3.

The cooling fluid plate 200 may also include a face 203. Process fluid passages 206 may be cut or otherwise formed into the face 203 and extend axially through the cooling fluid plate 200. These process fluid passages 206 may be generally congruent, for example, substantially identical in position and shape, to the process fluid passages 106 in the process fluid plates 100 (FIGS. 4A-4C). Further, the process fluid passages 206 may be defined proximal the outer diameter 204 (i.e., closer thereto than to the bore 202) and may be configured to provide for pass-through of the process gas, while preventing it from comingling with cooling fluid.

The cooling fluid plate 200 also includes cooling fluid ports 208, which are defined in the face 203 and extend through the cooling fluid plate 200. The cooling fluid ports 208 may be in fluid communication with cooling fluid manifolds, such as those described above with reference to FIGS. 1-3, and may be generally congruent, for example, substantially identical in shape and position, to the cooling fluid ports 104 defined in the process fluid plate 100 (FIGS. 4A-4C). The cooling fluid ports 208 may also each be aligned with one or more radial channels 210, which are cut or otherwise formed into the face 203. The sections of the face 203 in between adjacent radial channels 210 may be referred to as radially-extending fins 212. Further, circumferentially-extending channels 214 may be cut or otherwise formed in the face 203, may extend between the radial channels 210, and may be in fluid communication therewith. The sections of the face 203 between adjacent, circumferentially-extending channels 214 may be referred to as circumferentially-extending fins 216. Accordingly, the tops of the fins 212, 216 are generally even or flush with the remainder of the face 203, such that the face 203 is generally flat, except where the channels 210, 214 are defined. This may allow the face 203, as well as the tops of the fins 212, 216 to be flush-mounted to an additional structure, thereby providing a cover for the channels 210, 214 to retain the cooling fluid within the channels 210, 214.

Referring to FIGS. 4A-5B, in exemplary operation, each process fluid plate 100 provides a process fluid flowpath. Accordingly, process fluid is directed from components disposed within the bore 102 radially-outward through the radial channels 108, as schematically depicted by arrow 114. In the radial channel 108, the process fluid impinges the fins 112, as well as the contours of the radial channel 108, thereby transferring heat from the process fluid to the process fluid plate 100. The face 101 of each process fluid plate 100 is bonded or otherwise secured to the back of an adjacent plate 100 or 200; accordingly, there is substantially no flowpath area outside of the radial channels 108 into which the process fluid may leak. As such, the process fluid coursing through each radial channel 108 is maintained therein and directed to the process fluid passage 106 and then axially therethrough.

In each cooling fluid plate 200, cooling fluid may be admitted into the radial channels 210, via the cooling fluid ports 208 and proceed as schematically illustrated by arrow 218. Each radial channel 210 communicates with one or more of the circumferentially-extending channels 214, as shown, and thus the cooling fluid proceeds from the radial channels 210 into the circumferentially-extending channels 214. The fluid then proceeds through the circumferentially-extending channels 214 and into another set of radial channels 210. Finally, the cooling fluid is received into another cooling fluid port 208 and exits the cooling fluid plate 200, for example, proceeding back to a cooling manifold for re-cooling and/or conditioning, or removal. It will be appreciated, however, that the structures described for the process fluid plate 100 and the cooling fluid plate 200 may represent opposing sides of a single plate, rather than discrete plates.

Accordingly, the cooling fluid coursing through the channels 210, 214 transfers heat from the cooling fluid plate 200 to the cooling fluid. By stacking the cooling fluid plate 200 with the process fluid plate 100, heat from the process fluid is transferred to the process fluid plate 100, and then to the cooling fluid plate 200, where it is transferred to the cooling fluid. In addition, in embodiments where the cooling fluid plate 200 is flush-mounted to the back of the process fluid plate 100, some of the heat transferred into the process fluid plate 100 may be directly transferred to the cooling fluid, as the back of the process fluid plate 100 provides a cover for the channels 210, 214. Similarly, the back of the cooling fluid plate 200 may provide a cover for an adjacent process fluid plate 100. As such, some of the heat of the process fluid may be transferred directly to the cooling fluid plate 200, as the cooling fluid plate 200 provides the cover for each radial channel 108.

Moreover, the process fluid plate 100 and the cooling fluid plate 200, each may be integrally formed; that is, the channels, fins, passages, etc., can all be cut or formed from a single piece of material. In one example, this can be accomplished by traditional methods of casting, such as investment casting, by powder-metallurgy process, laser deposition, and/or by milling. In one specific embodiment, however, the contours of the channels 108, 210, 214 may be too small to be easily formed with such traditional techniques. As such, alternative techniques may be advantageously employed, for example, to provide printed circuit heat exchangers (PCHX). PCHX plates are generally formed using chemical or electrochemical etching or "machining" to form the desired contours.

In this case, the faces 101, 203 are masked between the intended channel areas with a substance that resists degradation by the chemical or electrochemical etching or milling medium. Such deposition may be effected by, for example, printing, screen-printing, or photographically, using a photoresist. The etching or machining medium is then applied, which removes the material from the plates 100, 200 in the unmasked areas, thereby creating the channels 108, 210, 214, while leaving, for example, the fins 112, 212, 216. Such PCHX fabrication processes may allow the use of a variety of materials for the plates 100, 200, such as, for example, steel, stainless steel, brass, copper, bronze, aluminum, combinations thereof, alloys thereof, or other materials. Moreover, forming the plates 100, 200 by chemical or electrochemical etching or machining allows the plates 100, 200 to be thinner than heat exchangers fabricated using traditional machining techniques. For example, the distance between the face 101 or 203 and the opposite side of the plate 100, 200 may be less than about 5 mm, less than about 4 mm, less than about 3 mm, or less than about 2 mm, with the channels 108, 210, 214 having a depth of less than about 2 mm, less than about 1.5 mm, less than about 1.0 mm, or less than about 0.5 mm.

Once constructed, a plurality of each type of plate 100, 200 (e.g., dozens, hundreds, or more) may be stacked together to form the stack of plates 22 or 43, for example, alternating between process fluid plates 100 and cooling fluid plates 200. Examples of such printed circuit heat exchangers may be formed in a similar fashion as that described in U.S. Patent Application having Publication No. 2009/0294113, and European Patent having Publication No. 0212878, the entirety of both being incorporated herein by reference to the extent consistent with the present disclosure.

Figure 6:
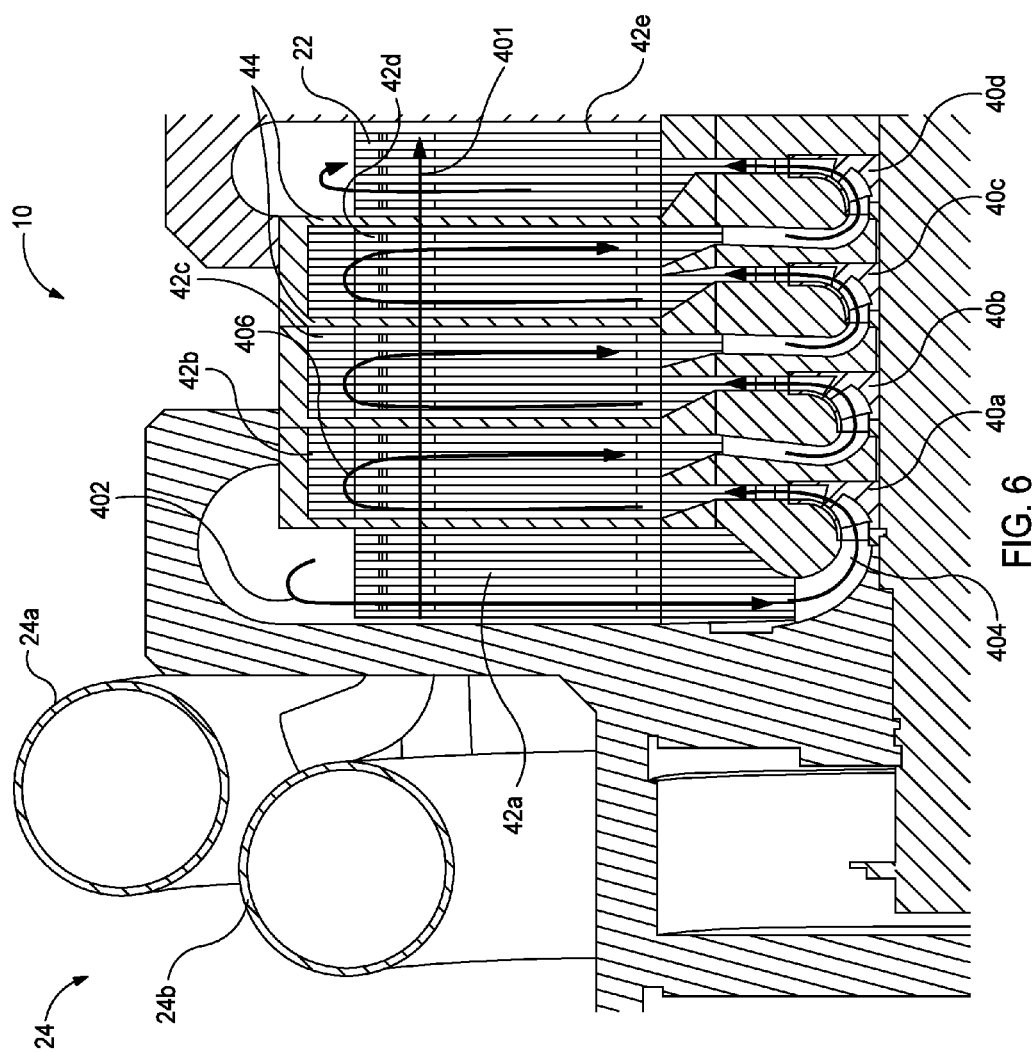
FIG. 6 illustrates an enlarged view of a portion of FIG. 3, illustrating the flowpaths provided by the compact compression system, according to one or more embodiments of the disclosure.

FIG. 6 illustrates a partial sectional view of the compact compression system 10, which is similar to the view illustrated in FIG. 3 and further illustrates the operation of the compact compression system 10. As described above, the compact compression system 10 includes the stack of plates 22. The stack of plates 22 may be made of a plurality of the process fluid plates 100 and a plurality of the cooling fluid plates 200, which are shown in and described above with reference to FIGS. 4A-5B. To form the stack of plates 22, the process fluid plates 100 and cooling fluid plates 200 may be interleaved. As the term "interleave" is used herein to describe the relative positioning of the plates 100, 200, it is not intended to be interpreted restrictively so as to require an alternating sequence of one cooling fluid plate 200, followed by one process fluid plate 100, and so in a repeating fashion. Although it may refer to such an arrangement, the term "interleave" as it is used herein is broadly defined to include any sequence of the plates 100, 200, for example, one, two, or more cooling fluid plates 200 being coupled together and followed by one, two, or more process fluid plates 100 that are coupled together, with the sequence repeating or varying through the stacks 22, 43.

Referring additionally to FIGS. 4A-5B, cooling fluid is received from the manifold tube 24a and proceeds through the stack of plates 22 generally in the direction of arrow 401 toward the opposing tube 26a (FIG. 3). The pressure of the cooling fluid and the size of the cooling fluid ports 104, 208 causes the cooling water to flood the channels 210, 214 of the cooling fluid plates 200. In other embodiments, additional structures may be used to route the cooling fluid into the channels 210, 214. The cooling fluid removes heat from the stack of plates 22, and ultimately from the process fluid, as described above. Further, as additional cooling fluid is pushed from the tube 24a into the stack of plates 22, heated or "spent" cooling fluid proceeds in the direction of arrow 401 until it is removed via the receiving tube 24b, 26b of the manifolds 24, 26 (FIG. 1).

Turning now to the process fluid flow path, the process fluid is received into the compressor 12 via the inlet 39 (FIG. 2). The process fluid is then channeled into and through the first section 42a of the stack of plates 22, as illustrated by arrow 402 (FIG. 6). Accordingly, the first section 42a channels the process fluid to the first impeller 40a. The first impeller 40a rotates on the shaft 34 to compress the process fluid, and the process fluid proceeds therethrough, as generally shown by arrow 404. Such compression also heats the process fluid. The compressed, heated process fluid is expelled from the impeller 40a and into the second section 42b, as generally illustrated by arrow 406.

The second section 42b defines a diffuser channel or first radial flowpath, allowing the process gas to proceed radially-outward from the impeller 40a. Since the stack of plates 22 is bonded together to form their own pressurized containment area, it thus also provides a return bend or axial flowpath, which turns the fluid from radially-outward to generally axial, and provides an axial flowpath for the process fluid as it proceeds through the process fluid passages 106, 206 defined in the plates 100, 200, until reaching the blank 44. The process fluid finally reaches a return channel or second radial flowpath, which channels the process fluid to the second impeller 40b. In an exemplary embodiment, no additional structures are required to provide these two separate channels, beyond the stack of plates 22.

Indeed, the radial channels 108 in some of the process fluid plates 100 of the second section 42b are aligned with the first impeller 40a, allowing fluid to proceed radially-outward therefrom in the first radial flowpath, while the radial channels 108 of the second section 42b are aligned with the second impeller 40b such that fluid is provided thereto from the second radial flowpath. As with the blank 44 that partitions the first and second sections 42a,b, another blank 44 ensures that no process fluid bypasses the second impeller 40b.

Accordingly, process fluid is directed between the impellers 40b-d in substantially the same fashion to pass fluid between the first and second impellers 40a,b. In a "straight-through" compressor, this may continue until the desired number of impellers (or other types of compression stages) are traversed. Although not shown, it will be appreciated, however, that one or more sections of the stack of plates 22 may be omitted, with the process fluid passing from one impeller 40a-d to another via more traditional diffuser channels, return bends, and return channels. The embodiment illustrated in FIG. 2, however, is a "back-to-back" compressor, providing two opposing compression sections. Accordingly, after reaching the impeller 40d and traversing the diffuser section 42e (FIGS. 3 and 6), the process fluid is transferred to the impellers 40e-h residing in the second compression section, as represented schematically by arrow 450 (FIG. 2). In the second compression section, the process fluid may traverse the impellers 40e-h via the sections 42f-j of the stack of plates 22 in a similar fashion to that described and illustrated for impellers 40a-f and sections 42a-e until reaching the outlet 41.

Figure 7:
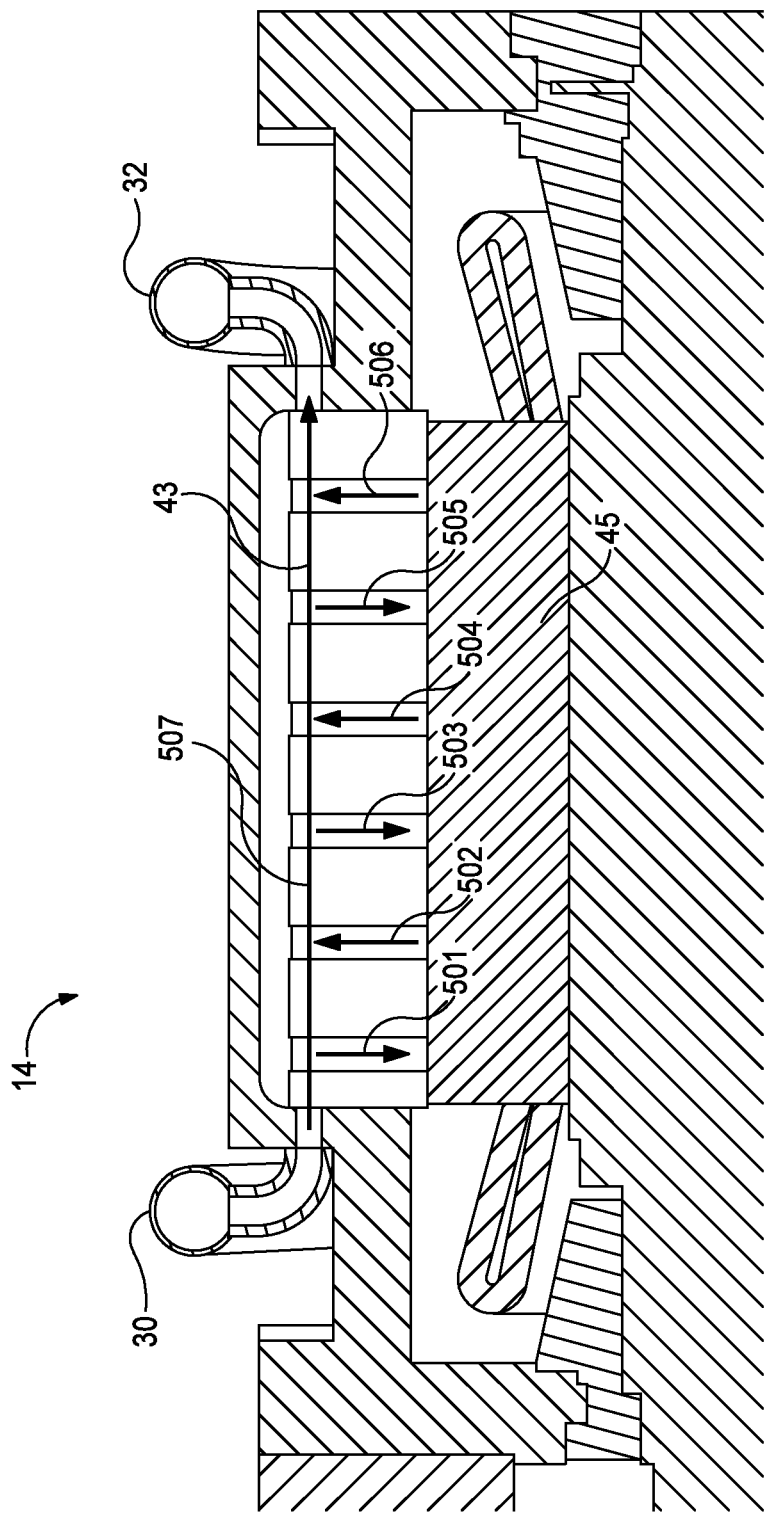
FIG. 7 illustrates a side, cross-sectional view of a motor in a casing for use in a compact compression system, in accordance with one or more embodiments of the disclosure.

FIG. 7 illustrates operation of the stack of plates 43 for the motor 14. The stack of plates 43 may be constructed in approximately the same way as the stack of plates 22, with alternating or otherwise interleaved process fluid plates 100 and cooling fluid plates 200, for example, which are shown in and described above with reference to FIGS. 4A-5B. Instead of process fluid, however, the process fluid plates 100 of the stack of plates 43 may channel a motor cooling fluid, as schematically depicted by arrows 501-506. Although not shown, the motor cooling fluid may also course through one or more cavities within the motor 14, thereby absorbing heat from the windings 45 and/or other components, such as bearings. The motor cooling fluid then courses through the stack of plates 43 and transfers heat to the cooling fluid. The cooling fluid circulates through the stack of plates 43, between the manifolds 30, 32, for example, in the general direction of arrow 507. Accordingly, heat from the motor cooling fluid is transferred via the stack of plates 43 into the cooling fluid, which is circulated out of the system 10, thereby removing heat from the motor 14.

Figure 8:
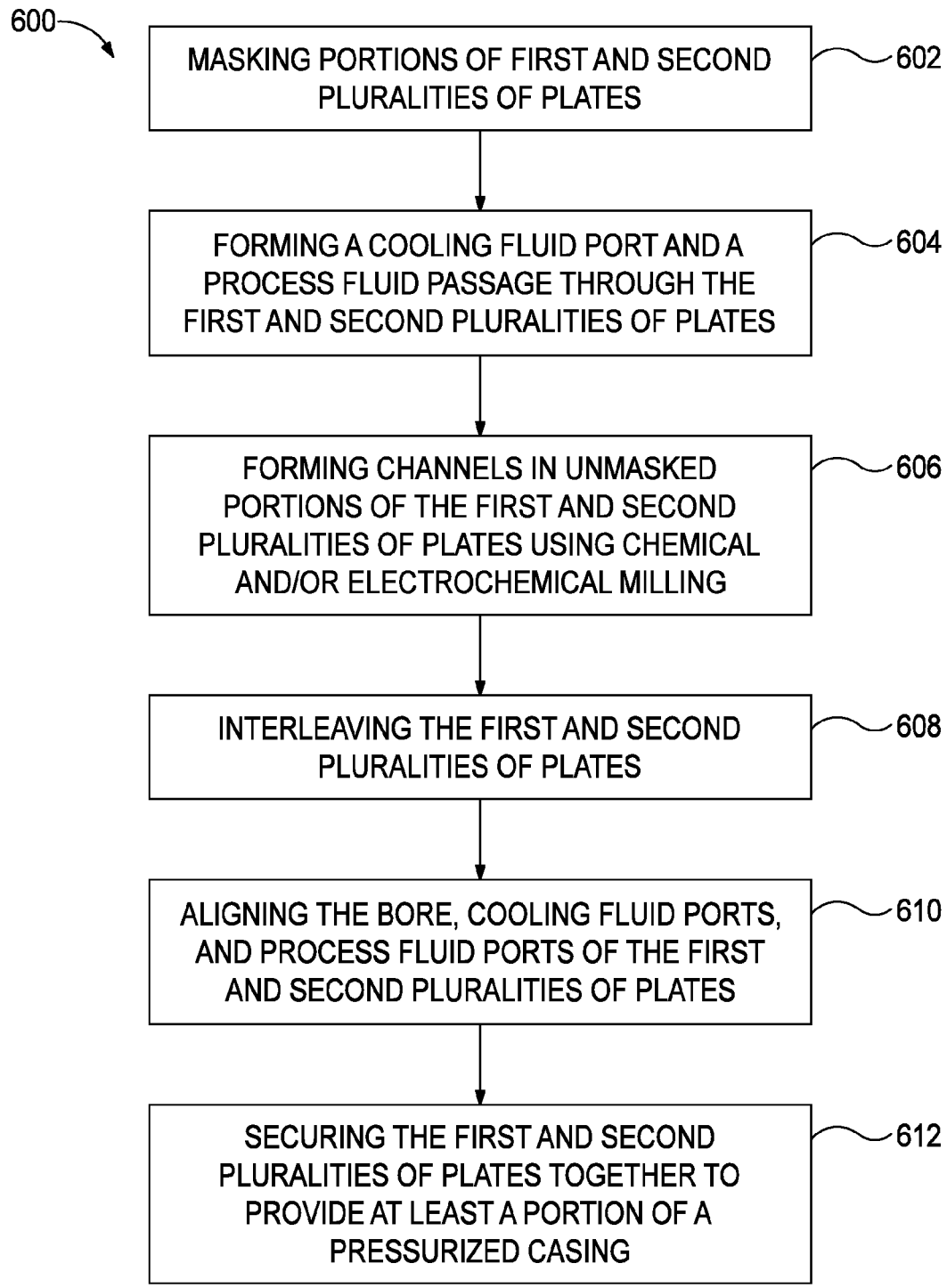
FIG. 8 illustrates a flowchart of a method for manufacturing a heat exchanger, according to one or more embodiments of the disclosure.

FIG. 8 illustrates a flowchart of a method 600 for manufacturing a heat exchanger for a turbomachine. The method 600 may result in a heat exchanger that is similar to the stack of plates 22 or 43 described above and may, accordingly, be best understood with reference thereto. The method 600 may include masking portions of a first plurality of plates and portions of a second plurality of plates, as at 602. Such masking may be accomplished by, for example, printing, screen-printing, or photographically, using a photoresist. The method 600 may also include forming a cooling fluid port and a process fluid passage through each of the first and second pluralities of plates, as at 604. This may be done by any suitable form of cutting or otherwise forming, such as, milling, drilling, casing, or chemical or electrochemical etching or "milling."

The method 600 may further include forming channels in unmasked portions of the first and second pluralities of plates using at least one of electrochemical and chemical milling, as at 606. The channels of the first plurality of plates may be formed such that they extend between a bore of each of the first plurality of plates and the process fluid passage thereof. The channels of each of the second plurality of plates may be formed such that they extend from the cooling fluid port thereof to, for example, a second cooling fluid port circumferentially spaced apart from the first cooling fluid port. Accordingly, the channels in each of the second plurality of plates may include two sets of radial channels which extend from one of the first and second cooling fluid ports and circumferentially-extending channels connected to the first and second sets of radial channels. Furthermore, in at least one embodiment, forming the channels as at 606 may include forming aerofoil shaped fins positioned within the channel. Such fins may be constructed of material from the plates that is protected during the chemical and/or electrochemical processing by being masked as described above.

The method 600 may further include interleaving the first and second pluralities of plates, as at 608. It will be appreciated that, as discussed above, "interleaving" does not require an alternating sequence of plates, but is defined to mean that the first and second plates are generally positioned in some sequence among one another. The method 600 may also include aligning the bore, cooling fluid port, and process fluid passage of each of the first and second pluralities of plates, as at 610. Such aligning does not require precise alignment, for instance, the cooling fluid ports may be slightly offset from each other such that they define a contour for a flowpath collectively defined by the cooling fluid ports. The same may be true for the bores and/or process fluid passages.

The method 600 may also include securing the first and second pluralities of plates together, as at 612. Such securing may cover the channels defined in each of the pluralities of plates and may form a monolithic structure configured to provide at least a portion of a pressurized casing for a turbomachine, a motor, or both. Such securing may be done by bonding, such as with any suitable adhesive or using any suitable diffusion bonding technique, or by welding, brazing, forging, or the like.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for housing a rotatable component, comprising:
   a first casing;
   a second casing spaced apart from the first casing and defining a gap therebetween;
   a cooling fluid manifold coupled to a source of a cooling fluid; and
   a stack of plates coupled to the first and second casings and extending therebetween to fill the gap such that the first and second casings and the stack of plates define a casing assembly pressurized containment area therein, the stack of plates including a bore in which the rotatable component is received, and further defining process fluid flowpaths configured to direct process fluid to and from the rotatable component, the stack of plates being in fluid communication with the cooling fluid manifold and configured to transfer heat from the process fluid to the cooling fluid wherein each plate includes at least one axial face that includes a channel configured to provide at least a portion of a process fluid flowpath wherein each channel is formed into a portion of the face located between the bore and an outer diameter of the plate to form a circumferential sealing edge adjacent the outer diameter such that the sealing edge of each plate abuts against an adjacent plate to form a seal therebetween such that the stack of plates form a plate pressurized containment area that forms a part of the casing assembly pressurized containment area and wherein the rotatable component includes first and second sets of compression components and the process fluid traverses the first compression components in a first axial direction and the second compression components in a second axial direction opposite the first axial direction and wherein the process fluid traverses the first and second compression components via at least one associated process fluid passage.

2. The apparatus of claim 1, wherein the stack of plates comprises:
   a process fluid plate defining a radial channel configured to provide at least a portion of one of the process fluid flowpaths; and
   a cooling fluid plate defining a radial channel in fluid communication with the cooling fluid manifold.

3. The apparatus of claim 2, wherein the process fluid plate and the cooling fluid plate are each printed circuit heat exchangers, each having a thickness between 0.5 mm and 5 mm.

4. The apparatus of claim 2, wherein:
   the process fluid plate includes a cooling fluid port extending therethrough, being in fluid communication with the cooling fluid manifold, and being prevented from fluidly communicating with the radial channel of the process fluid plate; and
   the cooling fluid plate includes a cooling fluid port extending therethrough and being in fluid communication with the radial channel of the cooling fluid plate and with the cooling fluid port of the process fluid plate.

5. The apparatus of claim 4, wherein the cooling fluid plate further includes:
   a second cooling fluid port in fluid communication with the cooling fluid manifold;
   a circumferentially-extending channel in fluid communication with the radial channel of the cooling fluid plate; and
   a second radial channel in fluid communication with the circumferentially-extending channel and with the second cooling fluid port.

6. The apparatus of claim 2, wherein:
   the process fluid plate includes a process fluid passage extending axially through the process fluid plate and positioned proximal an outer diameter thereof, the radial channel of the process fluid plate extending between and in fluid communication with the process fluid passage of the process fluid plate and the bore; and
   the cooling fluid plate includes a process fluid passage extending axially through the cooling fluid plate and positioned proximal an outer diameter thereof, the process fluid passage of the cooling fluid plate being in fluid communication with the process fluid passage of the process fluid plate and prevented from fluidly communicating with the radial channel of the cooling fluid plate.

7. The apparatus of claim 6, wherein the stack of plates is partitioned into sections, each of the sections including a plurality of the process fluid plates, a plurality of the cooling fluid plates coupled to and interleaved among the plurality of the process fluid plates, and a blank coupled to at least one of the plurality of process fluid plates or at least one of the plurality of cooling fluid plates.

8. The apparatus of claim 7, wherein the process fluid flowpaths include:
a first radial flowpath defined in at least one of the sections of the stack of plates and extending between the bore of the stack of plates and the process fluid passage of at least one of the plurality of the process fluid plates, the first radial flowpath configured to receive the process fluid from the rotatable component positioned in the bore and to channel the process fluid radially-outward;
an axial flowpath defined by the process fluid passage of the plurality of the process fluid plates in the at least one of the sections and the process fluid passages of the plurality of the cooling fluid plates in the one of the sections, the axial flowpath configured to receive the process fluid from the first radial flowpath and to channel the process fluid toward the blank of the one of the sections; and
a second radial flowpath defined in the at least one of the sections and extending between the process fluid passage of at least one of the plurality of plates and the bore of the stack of plates, the second radial flowpath configured to channel the process fluid from the axial flowpath to the rotatable component positioned in the bore.

9. The apparatus of claim 8, wherein:
the rotatable component includes first and second impellers;
the first radial flowpath of the one of the sections receives the process fluid from the first impeller; and
the second radial flowpath introduces the process fluid to the second impeller.

10. The apparatus of claim 2, wherein the process fluid plate includes airfoil-shaped fins disposed in the radial channel.

11. A heat exchanger for a turbomachine, comprising:
a cooling fluid manifold coupled to a source of cooling fluid; and
a stack of plates providing at least a portion of a pressurized casing and having a bore defined therein through which a rotatable component is received, the stack of plates defining process fluid flowpaths configured to direct process fluid to and from the rotatable component including:
a plurality of first faces, each including a cooling fluid port extending therethrough and in fluid communication with the cooling fluid manifold, a process fluid passage extending therethrough, and a plurality of channels extending from the bore to the process fluid passage, the plurality of channels being in fluid communication with both and configured to provide at least a portion of the process fluid flowpaths: and
a plurality of second faces each including a cooling fluid port extending therethrough and in fluid communication with the cooling fluid manifold, a process fluid passage extending therethrough, and a plurality of channels extending from the cooling fluid port and being in fluid communication therewith to distribute the cooling fluid wherein each channel is formed into a portion of the face located between the bore and an outer diameter of the plate to form a circumferential sealing edge adjacent the outer diameter such that the sealing edge of each plate abuts against an adjacent plate to form a seal therebetween such that the stack of plates form a plate pressurized containment area that forms a part of the pressurized casing and wherein the rotatable component includes first and second sets of compression components and the process fluid traverses the first compression components in a first axial direction and the second compression components in a second axial direction opposite the first axial direction and wherein the process fluid traverses the first and second compression components via at least one associated process fluid passage.

12. The heat exchanger of claim 11, further comprising:
a plurality of first plates, each providing one of the plurality of first faces; and
a plurality of second plates, each providing one of the plurality of second faces.

13. The heat exchanger of claim 12, wherein the plurality of first plates and the plurality of second plates are printed circuit heat exchangers, each having a thickness between 0.5 mm and 5 mm.

14. The heat exchanger of claim 11, wherein the stack of plates includes a blank that partitions the stack of plates into sections.

15. The heat exchanger of claim 14, wherein:
the rotatable component includes first and second impellers; and
at least one of the sections is configured to receive process fluid from the first impeller, channel it therefrom via the plurality of channels defined in at least one of the plurality of first faces, through at least one of the plurality of first faces via the process fluid passage thereof, through at least one of the plurality of second faces via the process fluid passage thereof, and to the second impeller via the plurality of channels defined in at least one of the plurality of first faces.

16. A method for manufacturing a heat exchanger, comprising:
masking portions of a first plurality of plates and portions of a second plurality of plates;
forming a cooling fluid port and a process fluid passage through each of the first and second pluralities of plates;
forming channels in unmasked portions of the first and second pluralities of plates using at least one of electrochemical and chemical milling, the channels of the first plurality of plates extending between a bore thereof configured to receive a rotatable component of a turbomachine, a motor, or both and the process fluid passage thereof, and the channels of the second plurality of plates extending from the cooling fluid port;
interleaving the first and second pluralities of plates;
aligning the bore, cooling fluid port, and process fluid passage of each of the first and second pluralities of plates; and
securing the first and second pluralities of plates together to cover the channels defined in each and to form a stack of plates having a monolithic structure configured to provide at least a portion of a pressurized casing for the turbomachine, the motor, or both wherein each plate includes at least one axial face that includes a channel configured to provide at least a portion of a process fluid flowpath wherein each channel is formed into a portion of the face located between the bore and an outer diameter of the plate to form a circumferential sealing edge adjacent the outer diameter such that the sealing edge of each plate abuts against an adjacent plate to form a seal therebetween such that the stack of plates form a plate pressurized containment area that forms a part of the pressurized casing and wherein the rotatable component includes first and second sets of compression components and a process fluid traverses the first compression components in a first axial direction and the second compression components in a second axial direction opposite the first axial direction and wherein the process fluid traverses the first and second compression components via at least one associated process fluid passage.

17. The method of claim 16, further comprising at least one of bonding, welding, and brazing the plates together to form the stack of plates.

18. The method of claim 16, wherein forming the channels in the first plurality of plates comprises forming airfoil-shaped fins positioned within the channel.

\* \* \* \* \*